(12) United States Patent
Ossieur et al.

(10) Patent No.: US 8,150,272 B2
(45) Date of Patent: Apr. 3, 2012

(54) SYSTEMS AND METHODS FOR TRANSFERRING SINGLE-ENDED BURST SIGNAL ONTO DIFFERENTIAL LINES, ESPECIALLY FOR USE IN BURST-MODE RECEIVER

(75) Inventors: Peter Ossieur, Sint-Andries Brugge (BE); Tine De Ridder, Zwijnaarde (BE); Johan Bauwelinck, Temse (BE); Xing Zhi Qiu, Wondelgem (BE); Jan Vandewege, Mariakerke (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 928 days.

(21) Appl. No.: 12/089,316

(22) Filed: Apr. 4, 2008

(65) Prior Publication Data

US 2011/0026921 A1 Feb. 3, 2011
US 2011/0311227 A9 Dec. 22, 2011

Related U.S. Application Data

(63) Continuation of application No. PCT/EP2006/067215, filed on Oct. 9, 2006.

(60) Provisional application No. 60/724,449, filed on Oct. 7, 2005, provisional application No. 60/841,816, filed on Sep. 1, 2006.

(51) Int. Cl.
*H04B 10/06* (2006.01)

(52) U.S. Cl. ........ 398/202; 398/208; 398/209; 398/210; 398/72; 398/58; 330/308; 330/59; 250/214 A; 250/214 AG; 375/319; 375/317

(58) Field of Classification Search .................. 398/202, 398/208, 209, 213, 214, 210, 135, 136, 137, 398/138, 139, 154, 155, 158, 159, 164, 72, 398/79, 58, 100; 330/308, 59, 279; 250/214 AG, 250/214 A, 214 LA, 214 R; 375/319, 317, 375/316, 318
See application file for complete search history.

(56) References Cited

U.S. PATENT DOCUMENTS 5,952,883 A * 9/1999 Masuta .......................... 330/279
(Continued)

FOREIGN PATENT DOCUMENTS
EP 0 580 089 1/1994
(Continued)

OTHER PUBLICATIONS

International Search Report for PCT/EP2006/067215 mailed Aug. 31, 2007.
(Continued)

*Primary Examiner* — Hanh Phan
(74) *Attorney, Agent, or Firm* — McDonnell Boehnen Hulbert & Berghoff LLP (57) ABSTRACT

Systems and methods for transferring incoming single-ended burst signals of which at least one characteristic varies widely from burst to burst onto a pair of differential lines. The systems comprise an input for receiving an incoming burst signal, a signal adaptation block for adapting said widely varying characteristic and a single-ended-to-differential converter. In a first aspect a reset signal for resetting a settings determination block, which controls the signal adaptation block, is sent backwards over the differential lines, preferably using a common-mode signal. In a second aspect, a status freezing mechanism is employed for freezing the settings of the settings determination block after the end of the preamble of an incoming burst.

22 Claims, 6 Drawing Sheets

U.S. PATENT DOCUMENTS

| | | | |
|---|---|---|---|
| 6,141,169 A | 10/2000 | Pietruszynski et al. | |
| 7,304,543 B2 * | 12/2007 | Ivry | 330/308 |
| 7,583,904 B2 * | 9/2009 | Weber et al. | 398/202 |
| 2003/0206744 A1 * | 11/2003 | Doh et al. | 398/209 |
| 2008/0205906 A1 * | 8/2008 | Murata | 398/208 |

FOREIGN PATENT DOCUMENTS

| | | |
|---|---|---|
| EP | 0 736 968 | 10/1996 |
| EP | 0 838 914 | 4/1998 |

OTHER PUBLICATIONS

Written Opinion of the International Searching Authority for PCT/EP2006/067215 mailed Aug. 31, 2007.

* cited by examiner

SYSTEMS AND METHODS FOR TRANSFERRING SINGLE-ENDED BURST SIGNAL ONTO DIFFERENTIAL LINES, ESPECIALLY FOR USE IN BURST-MODE RECEIVER

RELATED APPLICATIONS

This application is a continuation of PCT International Application No. PCT/EP2006/067215, filed on Oct. 9, 2006, which claims priority to U.S. Provisional Patent Application No. 60/724,449 filed Oct. 7, 2005, and of U.S. Provisional Patent Application No. 60/841,816 filed Sep. 1, 2006, all of which are incorporated herein by reference.

FIELD OF THE INVENTION

The invention relates to systems and methods for transferring incoming single-ended burst signals of which at least one characteristic varies widely from burst to burst onto a pair of differential lines. The systems and methods of the invention can for example be used in an optical receiver in optical fiber networks, especially if these networks require burst-mode transmission, in particular passive optical networks, for instance gigabit passive optical networks.

BACKGROUND OF THE INVENTION

Burst-mode transimpedance amplifiers (B-TIA), intended for use in the optical line termination (OLT) of gigabit passive optical networks (GPON), are preferably compliant to the ITU-T G.984.2 standard.

Burst-mode TIA must handle the upstream burst-mode transmission with the property that the signals arriving at the OLT consist of a rapid sequence of bursts with widely varying amplitudes from burst to burst.

Furthermore, to support the ITU-T G.984.2 class B, class B+ and class C operation, a TIA must have a large dynamic range. This can be provided by introducing means to provide a variable gain. Gain switching can extend the dynamic range, i.e. the level difference between the weakest and the strongest bursts that can be received.

A major problem in the development of a TIA front-end for a GPON system is the fact that after each burst, a reset signal is needed to prepare the receiver circuitry for a next burst. Indeed, in a conventional burst-mode receiver the automatic gain control circuitry needs to be reset after each burst.

When the guard time between bursts can be shorter than the maximum number of consecutive identical digits in a burst, it is not possible to detect the guard time between bursts. In that case in classical B-TIA's a reset signal needs to be provided externally to the TIA.

Usually, such a reset signal needs at least one additional I/O pin. This makes it difficult to integrate a TIA for GPON applications into the industry standard 5-pins TO-can package. Indeed, to ensure sufficient high sensitivity for class B, class B+ or class C operation an avalanche photodiode is required. Then, the following pins are needed:

Positive supply voltage for the TIA
Bias voltage for the avalanche photodiode
Negative supply voltage for the TIA (gnd)
Positive phase of the differential output
Negative phase of the differential output Hence, all 5 pins have been used, and no pins are left to provide a reset signal. In case only a PIN photodiode is used, one pin less can be used for monitoring. However, if one wants an additional RSSI (Received Signal Strength Indication) pin, the same problem remains, i.e. additional pins are needed on the TO-can package.

One may conclude that prior art transimpedance amplifiers (TIA), that require gain switching on a per-burst basis, hereafter also referred to as a burst-mode transimpedance amplifier or B-TIA, require at least one additional I/O pin to provide a reset signal to the automatic gain adjustment circuitry or any other adaptation circuitry which needs to be set for each burst. When the guard time between bursts can be shorter than the maximum number of consecutive identical digits in a burst, it is not possible to automatically detect the guard time between bursts. In that case prior-art variable-gain burst-mode transimpedance amplifiers require a reset signal to be provided externally, with the packaging problems as described before.

SUMMARY OF THE INVENTION

In a first aspect, a system and method are provided for transferring incoming single-ended burst signals of which at least one characteristic varies widely from burst to burst onto a pair of differential lines, with which the need for an additional I/O pin for a reset signal can be avoided.

This aim is achieved according to the first aspect with the system in accordance with the disclosed embodiments and claims.

In a second aspect, it is an aim to provide a system and method for transferring incoming single-ended burst signals with widely varying amplitudes from burst to burst onto a pair of differential lines, with which signal adaptations during data transmission can be avoided.

This aim is achieved according to the second aspect with the system according to the disclosed embodiments and the claims.

The systems and methods of the first and second aspects can for example be applied in any front-end or receiver, for example in an optical receiver in optical fiber networks, especially if these networks require burst-mode transmission, in particular passive optical networks, for instance gigabit passive optical networks.

In the following, the first and second aspects will be described separately, although they may be combined.

The system according to the first aspect may include the following components, an input for receiving an incoming burst signal, a signal adaptation block with at least one controllable adaptation element connected to said input and provided for adapting said at least one widely varying characteristic of the incoming burst signal, a single-ended-to-differential converter connected to said signal adaptation block for converting the burst signal to a differential signal to be placed on said pair of differential lines in forwards direction, an end-of-burst detector connected to said pair of differential lines and provided for detecting burst ends in said differential signal, a reset signal generator connected to said end-of-burst detector for generating a reset signal to be placed on said differential lines in backwards direction upon detection of one of said burst ends, a reset signal receptor connected to said pair of differential lines backwards from said reset signal generator, for receiving said reset signal, and a settings determination block connected to said reset signal receptor and said signal adaptation block, for controlling each adaptation element of said signal adaptation block upon receipt of said reset signal on the basis of a measurement of the incoming burst signal.

In the system and method of the first aspect, the burst end is detected on the differential lines after which the reset signal is generated and placed on the differential lines in backwards direction. The reset signal is picked up by the reset signal receptor and passed on to the settings determination block, which controls the signal adaptation block. So the reset signal is supplied via two pins which are already present anyway, namely those to which the differential lines are connected. In this way, the need for an additional pin or input for the reset signal is avoided and the system can be integrated into standard packages.

When implementing the first aspect on a burst-mode transimpedance amplifier (B-TIA) and front-ends (receivers) including such B-TIA's, sufficiently fast (nanosecond scale) gain optimization at the start of each burst can be enabled. This gain optimization can extend the receiver dynamic range, and can be so fast and accurate that it causes no loss of sensitivity or data. As a result, the front-end (receiver) is provided with a means for setting the gain of said amplifier fast, in order to handle burst mode operation with widely varying amplitudes from burst to burst, without requiring more I/O pins for providing said reset signal.

The settings determination block is provided for measuring the incoming burst and determining a suitable setting for each adaptation element in the signal adaptation block on the basis of this measurement, in order to prepare the system for the next burst to be received. The measurement can be taken on the single line directly after the signal adaptation block or on the differential lines.

In an embodiment, the reset signal generator is provided for modifying the common-mode level on the differential lines and the reset signal receptor is a common-mode level measurement block. In this embodiment, the reset signal is a modification of the common-mode level on the differential lines. This embodiment has the advantage that it is easy to implement and that the reset signal does substantially not disturb the burst signal or any of the data on the differential lines.

In an embodiment, the signal adaptation block, single-ended-to-differential converter, reset signal receptor and settings determination block are integrated in a first chip and the end-of-burst detector and reset signal generator are integrated in a second chip. These first and second chips are connected by means of the pair of differential lines, on which the bursts are conducted in forwards direction from the first chip to the second chip and the reset signal is conducted in backwards direction from the second chip to the first chip.

In a preferred embodiment, the input is formed by a photodiode for placement at a termination of an optical line, for optical to electrical signal conversion, for example in gigabit passive optical networks.

In a preferred embodiment, said first chip is a four I/O pins package with two pins for a positive and a negative supply voltage and two pins forming a differential output for connection to said pair of differential lines.

In another preferred embodiment, said first chip is a five I/O pins package with two pins for a positive and a negative supply voltage, two pins forming a differential output for connection to said pair of differential lines and one pin for providing a received signal strength indication.

In another preferred embodiment, said first chip is a five I/O pins package with two pins for a positive and a negative supply voltage, two pins forming a differential output for connection to said pair of differential lines and one pin for supplying a bias voltage to said photodiode.

The widely varying characteristics which may be adapted in the systems and methods according to the first aspect can for example be the amplitude of the incoming burst, the DC-offset of the incoming burst and/or any other characteristic of the incoming burst signal known to the person skilled in the art.

The system according to the second aspect may include the following components, an input for receiving an incoming burst signal, each incoming burst comprising a preamble and a subsequent data section, a signal adaptation block with at least one controllable adaptation element connected to said input and provided for adapting said at least one characteristic of the incoming burst signal, a single-ended-to-differential converter connected to said signal adaptation block for converting the burst signal to a differential signal to be placed on said pair of differential lines in forwards direction, a settings determination block connected to said signal adaptation block, for controlling each adaptation element of said signal adaptation block during treatment of said preamble on the basis of a measurement of the incoming burst, a status freezing mechanism connected to said input and said settings determination block, for freezing each adaptation element of said signal adaptation block during treatment of said data section of each incoming burst.

In the system and method of the second aspect, the settings of each controllable adaptation element are frozen during the stage in which the data section of the incoming burst is treated, i.e. the setting in the settings determination block is fixed at the value at which it has been set before during the preamble. In this way it can be avoided that the settings determination block can be triggered during treatment of the data section, which in absence of the status freezing mechanism may for example occur as a result of variations in the level of the burst and could lead to loss of data.

In a preferred embodiment, the start of the preamble is detected by comparing the incoming burst with an activity threshold in an activity detection block, which is connected to the input. When the activity threshold is crossed, a timer is triggered which has a predetermined time delay in function of the duration of the preamble. Upon completion of this time delay, a freezing signal is generated for the settings determination block, telling the latter that the preamble has passed and that each setting has to be frozen.

In a more preferred embodiment, the incoming burst is furthermore compared with an overload threshold by means of an overload detection block, which is connected to the input and is adapted for retriggering the timer and the freezing signal generator in the event that the overload threshold is crossed. This embodiment takes the problem into account that the activity threshold could be crossed prematurely, for example by the laser prebias field of a strong burst, causing early triggering of the timer. Without the overload detection, such could lead to the freezing of one or more settings before the determination of its value has been completed. The overload detection and retriggering of the timer overcomes this problem.

The widely varying characteristics which may be adapted in the systems and methods according to the second aspect can for example be the amplitude of the incoming burst, the DC-offset of the incoming burst and/or any other characteristic of the incoming burst signal known to the person skilled in the art.

A first aspect of a preferred embodiment relates to a method including the steps of a) communicating forwards with a first communication scheme (e.g. a differential scheme on a pair of differential lines), b) communicating backwards with a second communication scheme (e.g. a common-mode level on the pair of differential lines), said first and second communication schemes occurring over the same physical lines and being selected such that they are not disturbing each other.

For example, but not limited thereto, the forwards communication can be a burst signal, the backwards communication can be a reset signal, the first communication scheme can be a differential scheme on a pair of differential lines and the second communication scheme can be a common-mode level on the same pair of differential lines.

In an embodiment, the forwards communication comprises burst signals and the backwards communication comprises information on the end of said bursts.

According to the first aspect, the embodiments further relate to a system including a first signal processing system, provided for inputting a signal, processing said signal according to processing settings and outputting a first signal processed input signal in accordance with a first communication scheme, a second signal processing system, provided for receiving via one or more physical lines said first signal processed input signal in accordance with a first communication scheme, determining information needed for said first signal processing system for adapting its processing settings and outputting said information backwards via said one or more physical lines towards said first signal processing signal, said first and second communication schemes being selected such that they are not disturbing each other.

For example, but not limited thereto, the forwards communication can be a burst signal, the backwards communication can be a reset signal, the first communication scheme can be a differential scheme on a pair of differential lines, the second communication scheme can be a common-mode level on the same pair of differential lines, the first signal processing system can comprise a first amplifier and a single-ended to differential convertor, the second signal processing system can comprise a second amplifier and common-mode level modification means, and the processing settings can be one or more of a gain of the first amplifier, a DC offset correction or another processing setting.

In an embodiment, the forwards communication comprises burst signals and the backwards communication comprises information on the end of said bursts, which may be used for triggering processing setting determination circuitry in said first signal processing system, for example for determining the gain or DC offset settings for an incoming burst.

BRIEF DESCRIPTION OF THE DRAWINGS

FIGS. 8a and 8b show examples of timing diagrams of the status freezing mechanism of FIG. 7. FIG. 8a shows the situation in which the activity threshold is crossed by the onset of the Status Adaptation Field (situation b below). FIG. 8b shows the situation in which the activity threshold is crossed prematurely by the laser prebias field of a strong burst (situation c below).

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

Furthermore, the terms first, second, third and the like in the description and in the claims, are used for distinguishing between similar elements and not necessarily for describing a sequential or chronological order. The terms are interchangeable under appropriate circumstances and the embodiments can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present embodiments, the only relevant components of the device are A and B.

Figure 1:
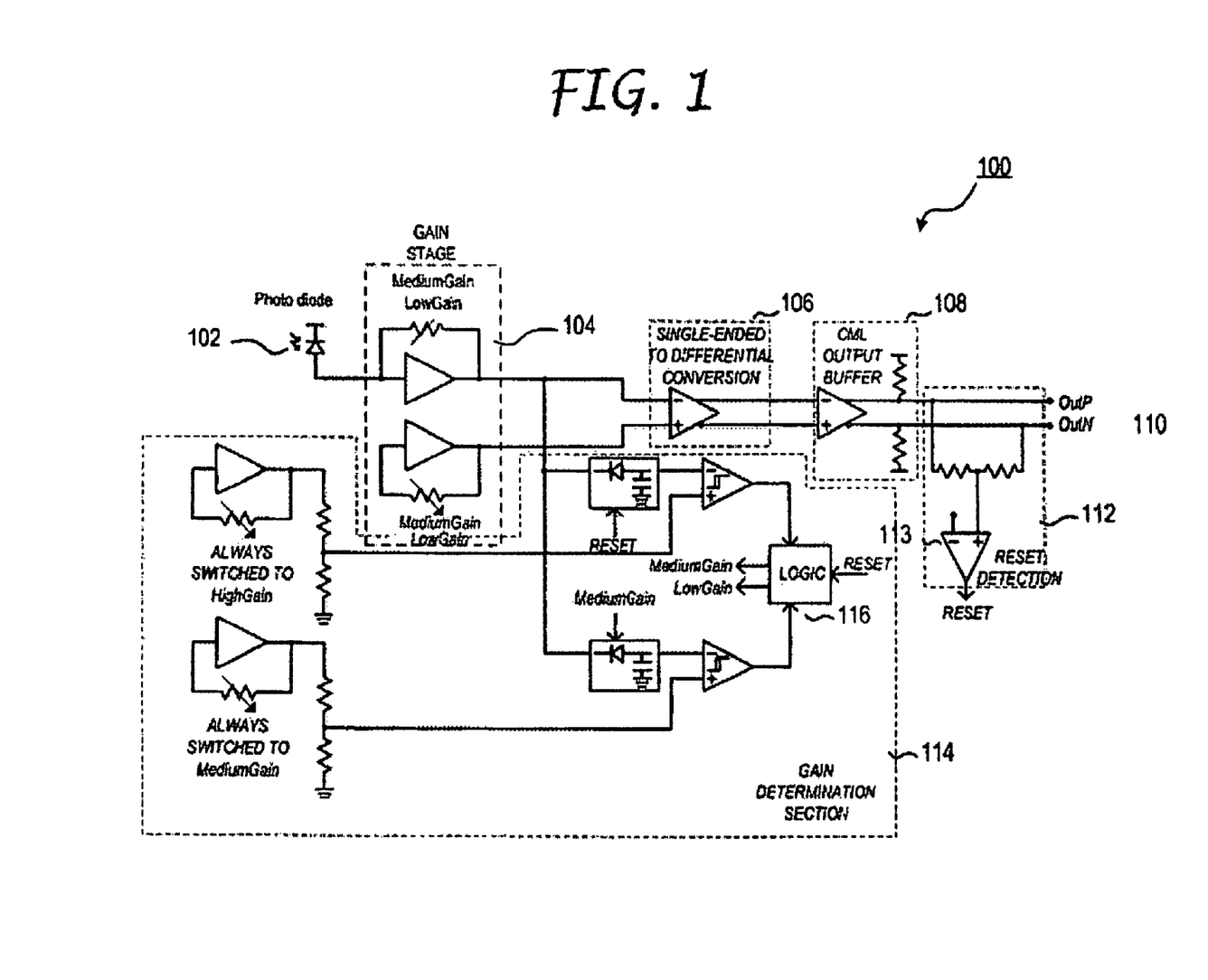
FIG. 1 shows an example of a front-end (receiver) in accordance with the present embodiment, in particular a photo-diode is shown, a gain stage, a single-to-differential converter, a common-mode driving circuit and a common-mode level measurement means, connected to the differential outputs of said system, said means incorporating a differential amplifier, said means providing a reset signal towards a gain determination block.

In the exemplary embodiment of FIG. 1, provided is a front-end (optical receiver) 100, for optical to electrical signal conversion, suited for use in optical access networks, in particular in gigabit passive optical network, said front-end being adapted for burst-mode reception with wide dynamic range. The front-end is so arranged that the gain is set within a few nanoseconds at the beginning of each incoming burst. The gain stage is provided by a transimpedance amplifier (TIA) 104 and the gain determination block 114 is an automatic gain control unit, preferably located at the very input of the front-end, is DC-coupled.

In an embodiment the developed burst-mode transimpedance amplifier (B-TIA) is intended for use in the optical line termination (OLT) of gigabit passive optical networks (GPON), wherein burst-mode operation is required, in order to be compliant to the ITU-T G.984.2 standard. The burst-mode TIA must handle the upstream burst-mode transmission. A special TIA is required, as the signal arriving at the OLT consists of a rapid sequence of bursts with widely varying amplitudes from burst to burst. In a present embodiment the properties of this signal are such that the burst-mode TIA should be fully dc-coupled. Furthermore, to support the ITU-T G.984.2 class B, class B+ and class C operation, the TIA must have a large dynamic range, requiring an automatic gain control (AGC) scheme. Setting this burst-mode TIA apart from more conventional TIAs is the fact that the gain is set within a few nanoseconds at the beginning of each incoming burst, so that no valuable data are lost.

A major problem in the development of a TIA front-end for a GPON system is the fact that after each burst, a reset signal is needed to prepare the receiver circuitry for a next burst. Indeed, for example in a conventional burst-mode receiver the automatic gain control circuitry needs to be reset after each burst. As it is not possible to make a distinction between the guard time between bursts (which can be shorter than the maximum number of consecutive identical digits in a burst), in classical TIA's a reset signal needs to be provided externally to the TIA.

Usually, such a reset signal needs at least one additional I/O pad on the TIA chip and one additional I/O pin on the TIA package, the presence and cost which is to be avoided. This makes it difficult to integrate a TIA for GPON applications into the industry standard 5-pins TO-can package. Indeed, to ensure sufficient high sensitivity for class B, class B+ or class C operation an avalanche photodiode is required. Then, the following pins are needed:

Positive supply voltage for the TIA
Bias voltage for the avalanche photodiode
Negative supply voltage for the TIA (gnd)
Positive phase of the differential output
Negative phase of the differential output Hence, all 5 pins have been used, and no pins are left to provide a reset signal. In case only a PIN photodiode is used, one pin less can be used for monitoring. However, if one wants an additional RSSI (Received Signal Strength Indication) pin, the same problem remains, i.e. additional pins are needed on the TO-can package.

The system 100 of FIG. 1 is a front-end (receiver), for optical to electrical signal conversion, suited for use in gigabit passive optical networks, which can be operated in a first case 4 I/O pins or in a second case 5 I/O pins, in particular a positive and negative supply voltage, a positive and negative phase for use as differential output in the first case and a fifth I/O pin for providing a bias photodiode voltage in the second case.

The system 100 does hence not require the extra pad and pin and provides for integration of the photodiode and the B-TIA into a single, low cost, industry standard 5-pins TO-can package.

Figure 2:
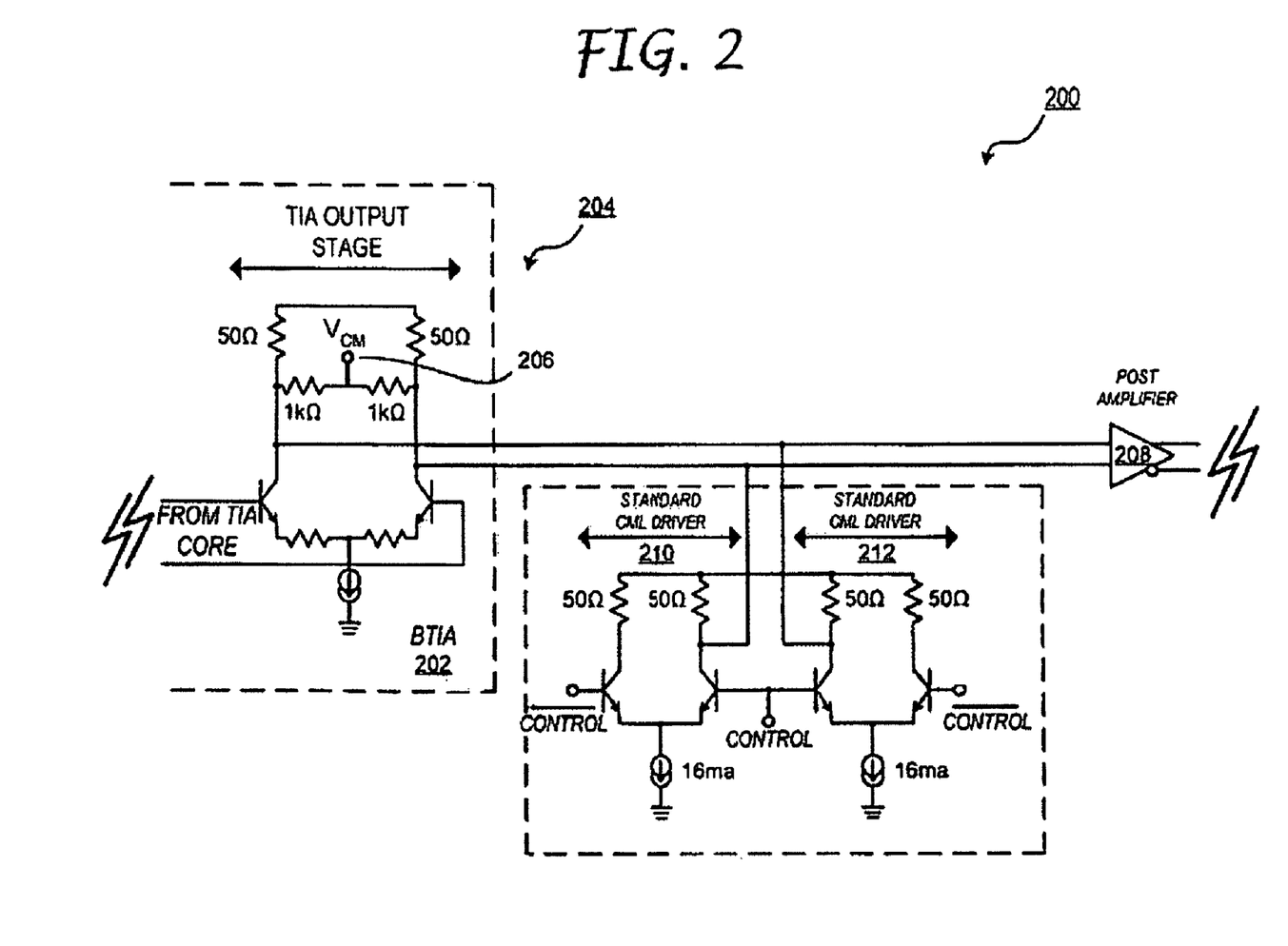
FIG. 2 provides a circuit implementation of said common-mode level measurement means, in combination of the amplifier output stage circuit implementation, in particular a circuit implementation being an adaptation of standard common-mode logic drivers. The interconnection of the B-TIA output stage (left) with a pair of CML drive stages located in the post-amplifier chip, and connected to its differential inputs. The logic inputs marked "control" provide the post-amplifier with a means to modify the common mode level of this CML interconnection. This circuit implementation is an adaptation of standard common-mode logic circuitry, and allows for the transmission of information in the backwards direction, from post-amplifier to B-TIA.

To avoid using an additional pin and still provide a reset signal, the common-mode level of the differential output is used as a means to signal a reset to the TIA. In an embodiment this is done in such a way, that standard CML (Current-Mode Logic) drivers can be used to create this reset signal. The circuit principle is shown in FIG. 2. Using two standard CML drivers, the common-mode level of the output stage of the TIA can be adjusted by the succeeding post-amplifier. It is straightforward for the B-TIA chip to detect a pulse on $V_{CM}$, hence a control signal can be sent by the post-amplifier and (re)generated inside the B-TIA chip without an additional pin. Such a control signal can be used to transmit information in backward direction, towards the B-TIA chip, e.g. to control an automatic gain control circuit on the B-TIA chip, as shown on FIG. 1.

FIG. 1 is a diagram depicting a front-end (receiver) in accordance with an exemplary embodiment. Front-end 100 is used in the optical line termination (OLT) of gigabit passive optical networks (GPON) and generally comprises optical-electrical conversion and amplification components for converting optical signals to electrical signals and varying the amplification to compensate for weak or intense light signals, as a result of these signals originating from different users. More particularly, conversion photodiode 102 receives a light signal from, for example, an optical fiber, and converting the optical light signals to electrical signals for use in B-TIA front-end 100. The output of photodiode 102 is electrically coupled to the input side of gain stage 104, which also receives variable gain setting information from gain determination section 114. Gain determination section 114 takes measurements from signals on the output gain stage 104 for determining information, such as a suitable B-TIA gain, in order to prepare the B-TIA for the next burst to be received. However, output gain stage 104 must be reset between bursts.

The output of gain stage 104 is also electrically coupled to the input side of single-ended to differential converter 106. Front-end 100 further comprises common-mode driving circuits 108 and common-mode level measurement section 112 for measuring the common-mode level of the differential outputs of the B-TIA. Common-mode level measurement section 112 incorporates differential amplifier 113, whereby common-mode level measurement section 112 can regenerate a reset signal for use by gain determination section 114.

The components shown in FIG. 1 may all be integrated into a single chip, a standard 4- or 5-pin package. The reset signal is generated outside this chip and sent backwards via a modification of the common-mode level of the differential lines 110. The common-mode level measurement section 112 detects this modification and thereupon warns the gain determination section 114. In other words, the common-mode level measurement section 112 acts as reset signal receptor.

FIG. 2 is a diagram depicting a circuit implementation of the common-mode level modification section 200, by which the reset signal is generated, in combination of the B-TIA output stage circuit implementation 204 and a post amplifier 208, in accordance with an exemplary embodiment. Common-mode level modification section 200, as depicted, shows an exemplary circuit implementation as being an adaptation of standard CML (Current-Mode Logic) drivers 210 and 212. As such, the standard CML drivers can be used to modify the common-mode of the differential line and so create the reset signal for the gain determination of the B-TIA 202.

B-TIA output stage 204 (left) is coupled with the differential inputs of post-amplifier 208 (i.e. with post-amplifier 208 residing on the post-amplifier chip, B-TIA output stage 204 is also connected to the differential inputs of the post-amplifier chip). The logic inputs labeled as "control" in CML drive stages 210 and 212 of the figure provide post-amplifier 208 with a means to modify the common-mode level of this CML interconnection. The post-amplifier 208 is provided for detecting the end of each burst in the incoming signal and thereupon controls the CML drivers 210 and 212 to modify the common-mode level. Hence a reset signal is created, which can be detected (or regenerated) inside the B-TIA chip 202 without an additional pin. In the B-TIA 202 the reset pulse is detected on $V_{CM}$ 206 of the common-mode measurement section. The reset pulse used to trigger components in the chip which need to be reset after each burst, for example the automatic gain control circuit shown as gain determination section 114 in FIG. 1, or for example an automatic DC offset control circuit (not shown) or any other component which needs to be reset after each burst.

Figure 3:
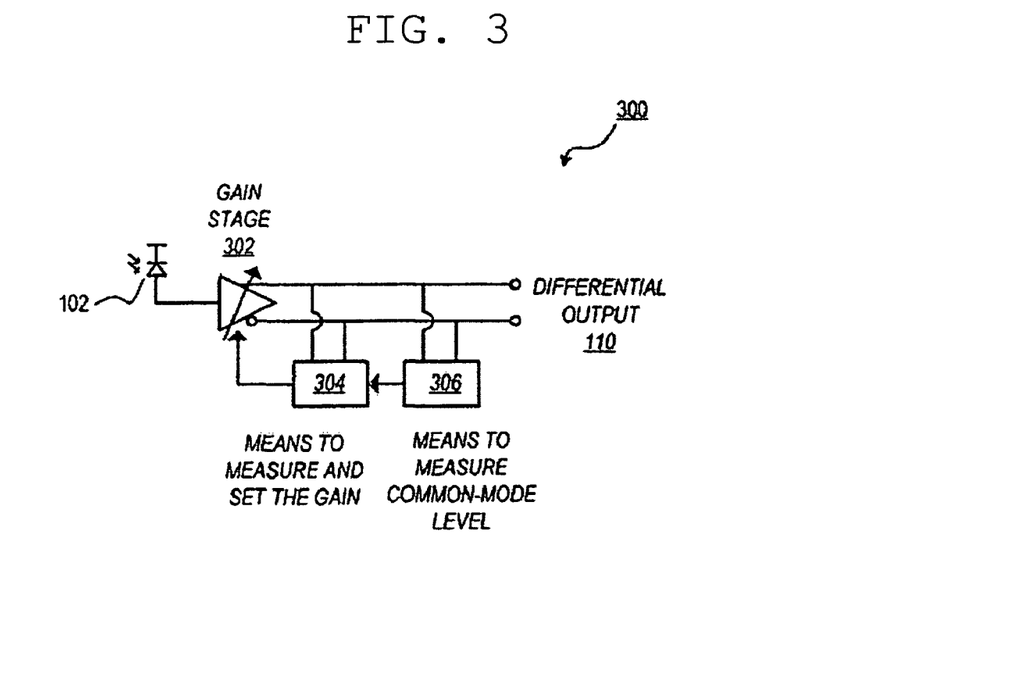
FIG. 3 shows in particular a photo diode, a gain stage, providing a differential output, a means to modify the common-mode level, a means to determine from said common-model level the gain for said gain stage.

FIG. 3 shows the concept generally, in particular photodiode 102, amplifier with controllable gain stage 302 and converter for providing a differential output 110, gain determination section 304 which is connected to the differential lines for measurement purposes, e.g. for measuring the amplitude of the burst signal and determine a suitable gain setting for the gain stage 302 therefrom, and reset signal receptor 306 implement as means to measure the common-mode level. The measurement of amplitude or other characteristics of the incoming signal by gain (or other settings) determination section 304 may also be taken directly after the controllable gain stage 302, i.e. before the signal is converted to differential.

Figure 4:
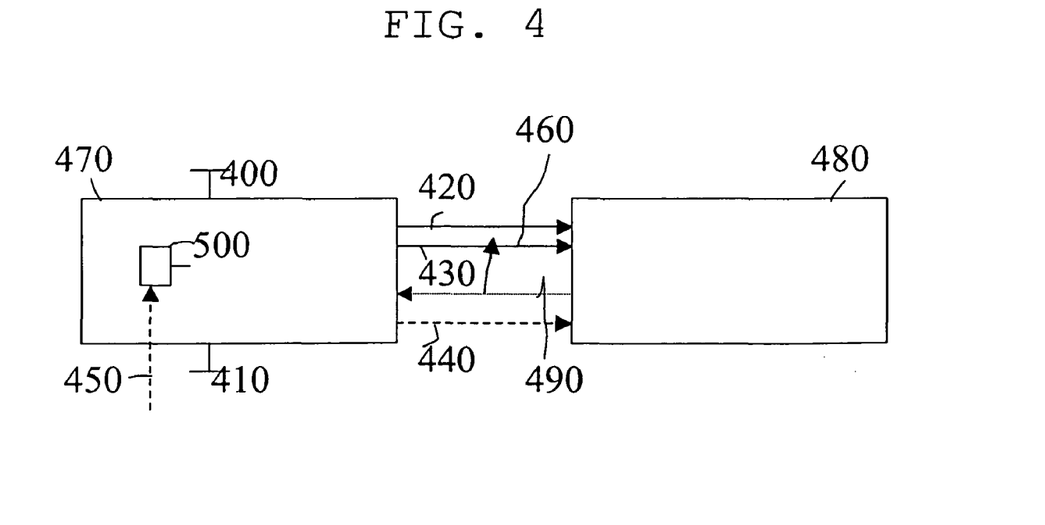
FIG. 4 schematically shows a first preferred embodiment of the system, in particular the integration into a standard package with 4 or 5 pins.

FIG. 4 shows an embodiment of the system integrated into chips with standard packages. A first chip 470 communicates with a second chip 480, via communication means, namely differential line 420 and 430, in a first forwards direction 460 (from first to second chip) and in a second backwards direction 490 on said same communication means 460.

The first forwards direction 460 of communication is implemented as a differential communication and the backwards direction 490 is implemented as common-mode signal over the same differential lines 420, 430. This arrangement enables the use of a minimum set of pins on said first chip 470, in particular a power supply 400, a ground 410 and two differential outputs 420 and 430 (also acting together as common-mode input). Optionally a fifth pin may be used, still within the specifications of standard packages, for either backbiasing 450 the photodiode 500, which forms the input for the signal to be transferred on the system, or for RSSI (Received Signal Strength Indication) monitoring 440, which may be foreseen.

Figure 5:
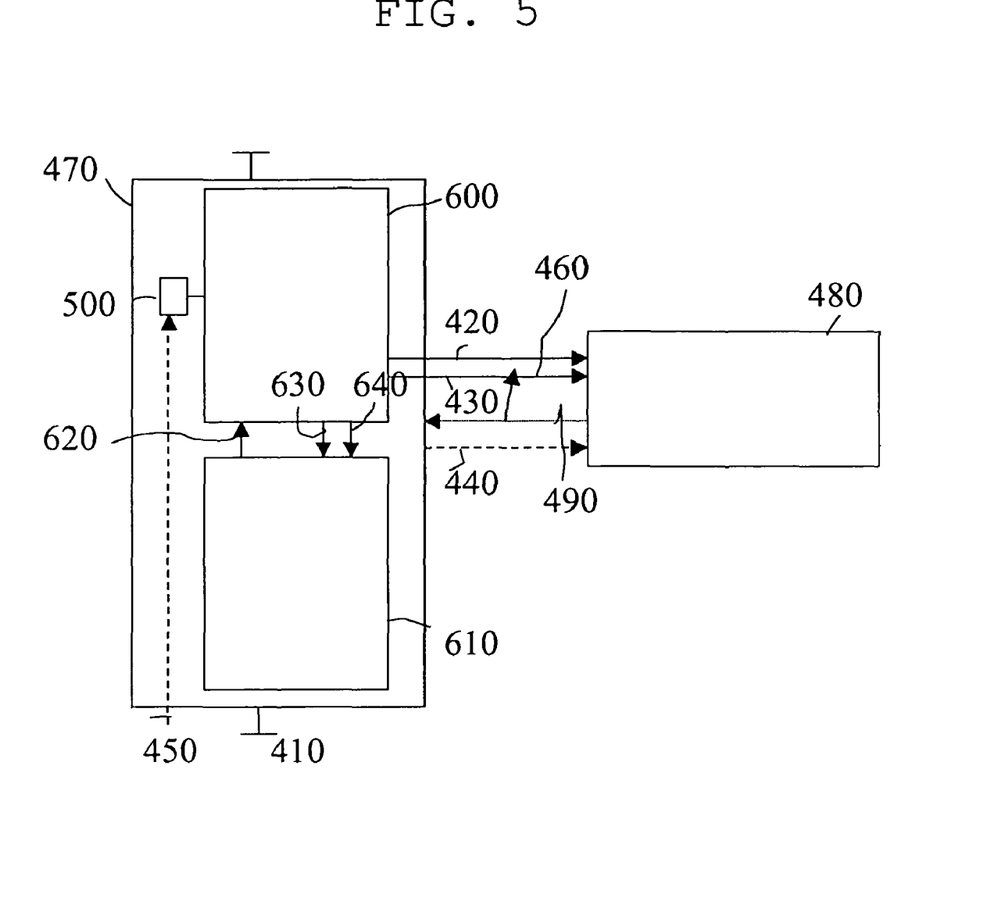
FIG. 5 schematically shows a second preferred embodiment of the system which is a specific embodiment of that of FIG. 4, in particular with a first part for first signal processing and a second part for determining processing settings for the first part on the basis of inputted signals/information.

The embodiment of FIG. 5 elaborates on the embodiment of FIG. 4. Here, the first chip 470 comprises a first part 600 and a second part 610. The first part performs signal processing and the second part determines processing settings for the first part. The first part 600 receives an input signal from the photodiode 500 and control 620 from the second part 610. The second part 610 receives as input measurement data 630 and a reset signal 640, which are here supplied via the first part 600. The measurement data 630 is obtained by measuring conditions of the signal under processing. The reset signal 640 indicates that said determining of new settings must be performed and is derived from the common-mode signal 490 sent back by the second chip 480.

Figure 6:
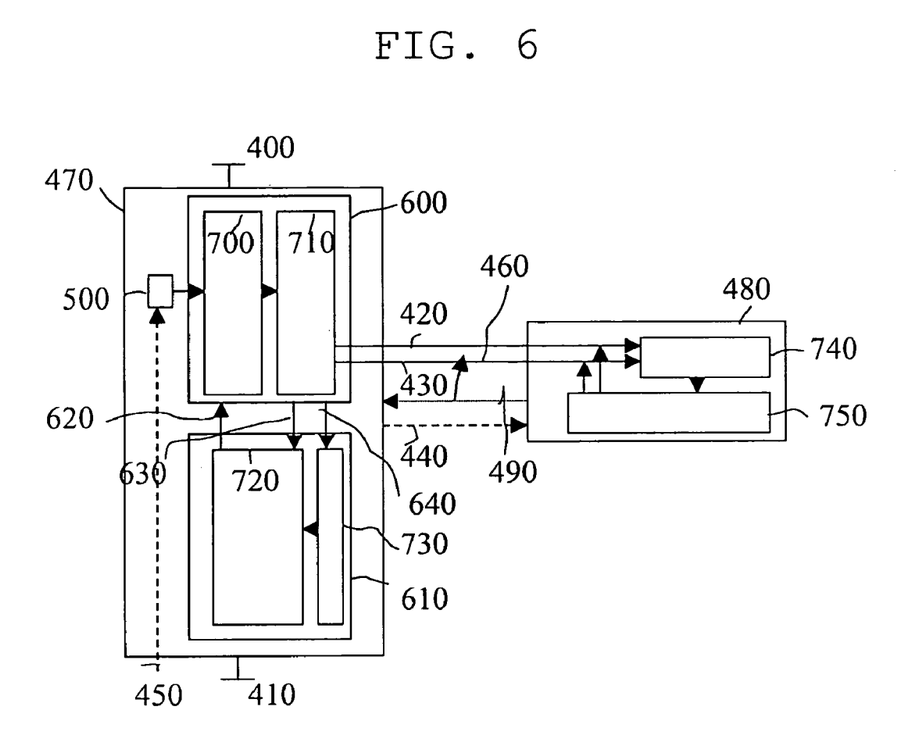
FIG. 6 schematically shows a third preferred embodiment of the system, which is a specific embodiment of that of FIG. 4, in particular with an amplifier and a single-ended to differential converter in the first part and a reset signal receptor and a settings determination block in the second part.

The embodiment of FIG. 6 elaborates on the embodiment of FIG. 5. As shown, the second chip 480 comprises a part 740 function for detecting the need to adapt the signal processing settings of first part 600; for example part 740 can be an end-of-burst detector. This need to adapt settings is indicated to another part 750 for generating the backward signal by adapting the common mode signal level, so part 750 can be designated as reset signal generator. Said part 750 may be the common-mode buffer within chip 480.

In the first part 600 of the first chip 470, performing the signal processing, a signal adaptation block 700, e.g. an amplifier with controllable gain or a DC-offset correction or other, and a single-ended to differential converter 710 are provided. In the second part 610, determining the processing settings, a reset signal receptor 730 and a settings determination section 720 are provided. The reset signal receptor 730 detects the common-mode signal 640 and indicates the start of the procedure for determining processing settings to the settings determination section 720. The reset signal receptor may for example comprise a differential amplifier connected to both lines 420, 430 on one input and a reference on the other input. Alternatively the reset signal receptor 730 may be the common-mode buffer within block 710.

Upon being triggered by the reset signal receptor 730, the settings determination block 720 takes measurement data 630, which may for example comprise an amplitude and/or a DC-offset and/or another characteristic of the incoming signal coming from the photodiode 500, processes this data e.g. by comparison to one or more preset levels and returns a control signal 620 comprising the determined settings to the signal adaptation block 700. This control signal 620 may for example comprise a gain setting, a DC-offset setting or any other setting for adapting any other characteristic of the incoming signal.

In the following, the settings freezing mechanism will be described. The following abbreviations and definitions are used:
B-TIA: Burst-mode TransImpedance Amplifier
GPON: Gigabit Passive Optical Network
TEF: Threshold Extraction Field
SAF: Status Adaptation Field
SFF: Status Freeze Flip-flop
SFM: Status-Freeze Mechanism The GPON B-TIA of the exemplary embodiment of FIG. 1 includes circuitry to first quickly change the gain of the B-TIA at the beginning of an incoming burst, by switching gain setting elements 104. The decision to perform this gain switching is based upon the amplitude of the incoming burst. Then the exemplary embodiment resets the gain back into its initial status, and hence prepares the B-TIA for a new burst. For this purpose, an external reset signal is provided via a common-mode signaling mechanism 112 implemented on the B-TIA output.

Other designs may contain a different form of adaptation, changing the status of elements performing gain control, offset control or measurements, during the start of the incoming burst.

To cover the entire input signal dynamic range, status changes are needed within the B-TIA, or in the chip following the B-TIA, to be able to handle both weak signals (which require high gain and sensitivity) and strong signals (which require low gain and/or extra offset compensation).

The gain-adaptive B-TIA of FIG. 1 compares the input signal level against a number of predefined signal levels. Each time the input level exceeds such a predefined signal level, the gain is reduced by setting appropriate switches in the B-TIA front-end 100.

It is desired that the gain of the B-TIA is set quickly at the beginning of a burst (hereafter called the preamble), and that the gain status remains constant during the remaining portion of this burst. As will be described below, there are at least two situations which could result in sudden status switching during the remaining portion of the burst:

1. If the input signal level is very close to the point where the gain switching should occur, then a small increase in this input signal level, or any noise on this input signal level can trigger the gain switching mechanism. A small increase in this signal level or a noise peak may happen long after the end of the preamble, and hence the gain can switch suddenly alongside a packet.

2. If the input signal level is very close to the point where the gain switching should occur, then it is possible that the delay of the comparator used to compare the input signal level against a reference signal level where the switching should occur is much longer than expected. The gain switching can then occur much later after the beginning of the burst.

Similar problems may occur when other TIA settings are adapted, or when the gain setting is performed differently. From these observations, it is clear that there is a need for a mechanism to freeze the TIA and/or limiting amplifier adaptation status once the first part of the preamble, during which adaptation is allowed, has passed.

A Status-Freeze Mechanism (SFM) that covers the peculiarities of the ITU-T G.984.x GPON signal is described hereafter. It is clear that the same or a similar SFM can be applied for any other type of GPON signals.

Let us consider a typical design of the first part of the preamble to be used in a GPON 1.25-Gb/s upstream channel. This is only a typical design, as the actual preamble fields and their time span may differ from one implementation to another.

Minimum guard time after the end of the preceding burst=25.6 ns

Maximum length of the prebias field=12.8 ns

Status Adaptation Field (SAF): A number of bits needed for signal level measurement and status adaptation, e.g. 10 successive '1' bits, corresponding to 8 ns at 1.25 Gbps.

Threshold Extraction Field (TEF): Additional 1's needed for subsequent "high" level extraction, needed for the threshold extraction, e.g. 6 successive '1' bits, corresponding to 4.8 ns at 1.25 Gbps.

Threshold Extraction Field: Additional 0's needed for subsequent "low" level extraction, needed for the threshold extraction, e.g. 6 successive '0' bits, corresponding to 4.8 ns at 1.25 Gbps.

The above preamble contents are programmable and controlled by the optical line termination (ITU-T G.984.x). The exact preamble composition may depend on the adaptation principles used, and on implementation details of the B-TIA and the following burst-mode limiting amplifier.

In order to allow for a correct threshold extraction, the SFM must freeze the front-end status prior to the start of the first TEF. In principle, two mechanisms are possible to define the exact moment in time when the gain must be frozen.

1. Status Freezing after a Synchronous Reset.

This requires that the time interval between the external B-TIA reset signal and the start of each incoming burst is constant and known by the B-TIA. A fixed on-chip timer, triggered by this reset signal, could then generate a delayed status-freezing signal. As the synchronism must be accurate on a bit scale, this imposes a severe requirement on the generation and transport of the external reset signal. Another disadvantage is that this synchronous approach cannot be used during ranging, where the time gap between reset and start of burst is unknown, and no synchronous reset can be provided.

2. Status Freezing after an Asynchronous Reset.

An asynchronous reset places the B-TIA in a high-sensitivity status, which can last for an undefined time span until a burst arrives. A simple implementation requires that the B-TIA can detect the start of a new burst accurately and unambiguously, e.g. by detecting the crossing of a preset activity threshold level. The high dynamic range of the GPON signals however makes that several situations can happen:

a) The incoming signal is weaker than the activity threshold.

b) The activity threshold is crossed by the start of the SAF. This is the preferred situation.

c) The activity threshold is crossed prematurely by the laser prebias field of a strong burst.

What follows is a method and circuit that deals with these issues, and provides accurate status freezing in all circumstances including ranging, as it does not rely on synchronism between the external reset signal and the instant of arrival of the new burst. So, as long as the burst signal does not show excessive level increases (which would result in bit errors in the subsequent receiver chain anyhow), no status changes will occur after the SAF, and the timing requirements on the external reset signal are much relaxed.

Although the circuit is designed for a gain-switching 1.25 Gbps GPON B-TIA, that can switch between three different states ('weak burst' after external reset, 'medium burst' and 'strong burst'), the method can easily deal with any adaptation mechanism in a TIA or optical front-end that is related to the properties of the incoming burst, and is only allowed to occur during a limited time window, such as, but not limited to:

discrete gain setting (gain switching) with more or less gain states.

continuous gain setting an adaptive offset compensation during the first part of the preamble a measurement of the burst properties during the start of the preamble, such as signal level(s), offset, duty cycle etc.

This method is generic, and can also operate at very different data rates, and in other burst-mode front ends used in electronic communication, radar, sonar or in instrumentation.

Figure 7:
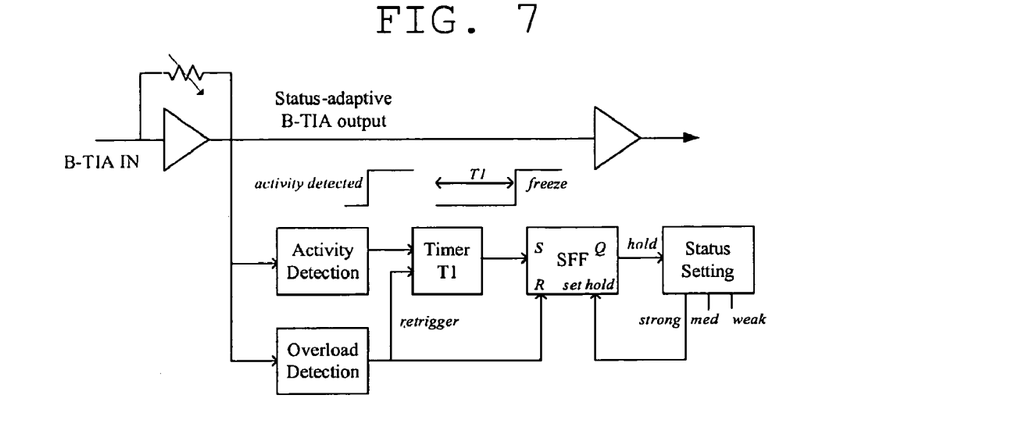
FIG. 7 shows the building blocks of a status freezing mechanism which can for example be incorporated in the front-end of FIG. 1 or in any other embodiment shown in FIGS. 2-6.
Figure 8A:
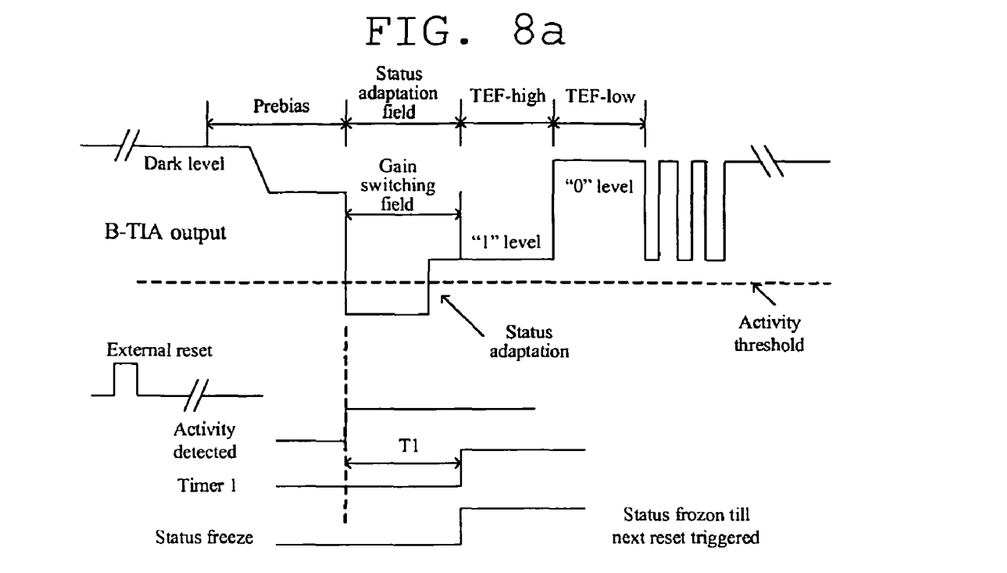
Figure 8B:
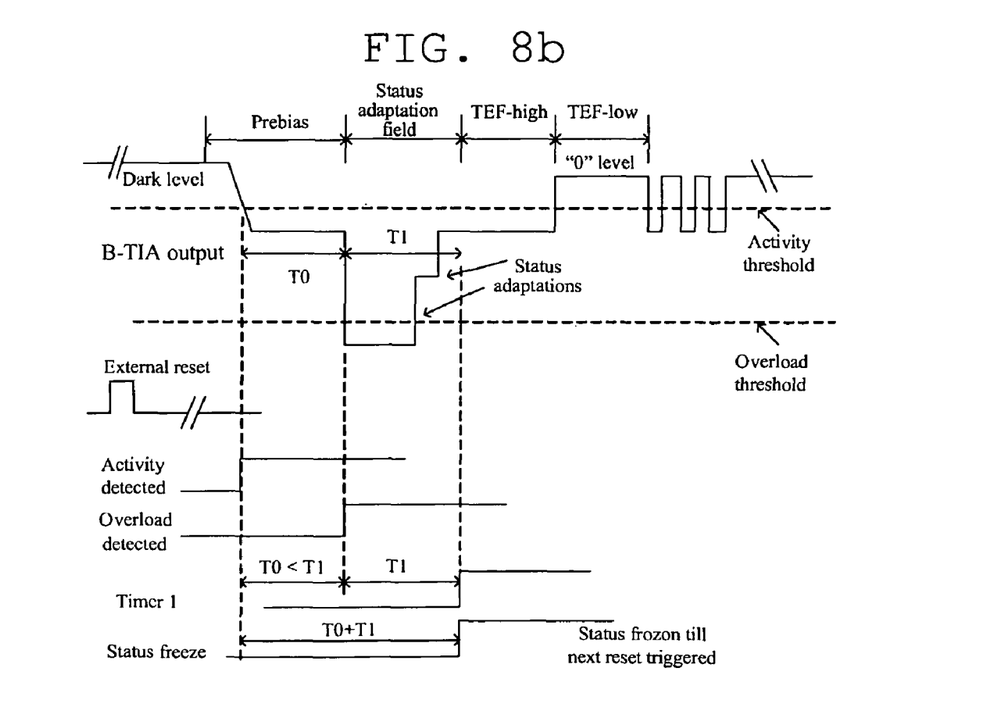

The method relies on the definition of two signal level thresholds, an activity threshold and an overload threshold. It assumes that an external reset has occurred, placing the B-TIA and its associated logic in a 'weak burst' state for an indefinite time. FIG. 7 gives a circuit block diagram, and the associated timing waveforms for GPON are shown in FIG. 8. Following actions are taken depending on the three situations mentioned above:

a) The Incoming Signal is Weaker than the Activity Threshold.

An activity threshold is defined that is sufficiently below the decision level for a first adaptation, e.g. the switching from 'weak burst' to 'medium burst' setting. Weak bursts that pass under this activity threshold will not activate the adaptation mechanism. As the activity threshold is well below the first adaptation threshold, only strong increases of the burst level could cause the onset of an adaptation later during this burst.

For weak bursts, no status-freezing is performed, and the B-TIA acts as a highly-sensitive, time-invariant front-end amplifying weak signals.

b) The Activity Threshold is Crossed by the Onset of the Status Adaptation Field.

When the incoming burst crosses the activity threshold, the activity detect circuit triggers Timer 1. Upon completion of this time delay, the gain settings, or all adaptations made till this moment, are frozen in the actual status by setting the Status Freeze Flipflop (SFF), which holds the logic circuitry marked as "Status Setting" in a fixed status.

c) The Activity Threshold is Crossed Prematurely by the Laser Prebias Field of a Strong Burst.

Again, the activity detect circuit triggers timer T1, and upon completion of this time delay, all status settings are frozen in the actual status. As the activity detection is premature, there is a possibility that the status setting is not completed when timer T1 runs out, and that the onset of the SAF following the prebias causes an overload. This is detected by overload detection, comparing the signal level with an overload threshold that is sufficiently above the allowed 1 output level. Overload detection extends the status-adaptation time window by retriggering timer T1. In most cases, T1 will not have completed its preset time delay, and the retriggering acting makes T1 add a full time delay. In case of a long prebias however, when T1 had completed its time delay, this retriggering will reset the status freeze flipflop SFF again and start a second status-adaptation window.

A feedback link from the Status Setting logic to the Status Freeze Flipflop SFF assures that, whenever the 'strong burst' status is reached, this status is frozen until the arrival of an external B-TIA reset.

The timing diagrams (FIGS. 8a and 8b) illustrate the successive events in each of the situations b and c.

The invention claimed is:

1. A system for transferring incoming single-ended burst signals of which at least one characteristic varies widely from burst to burst onto a pair of differential lines, said system comprising:
    an input for receiving an incoming burst signal;
    a signal adaptation block with at least one controllable adaptation element connected to said input and provided for adapting said at least one widely varying characteristic of the incoming burst signal;
    a single-ended-to-differential converter connected to said signal adaptation block for converting the burst signal to a differential signal to be placed on said pair of differential lines in forwards direction;
    an end-of-burst detector connected to said pair of differential lines and provided for detecting burst ends in said differential signal;
    a reset signal generator connected to said end-of-burst detector for generating a reset signal to be placed on said differential lines in backwards direction upon detection of one of said burst ends;
    a reset signal receptor connected to said pair of differential lines backwards from said reset signal generator, for receiving said reset signal; and
    a settings determination block connected to said reset signal receptor and said signal adaptation block, for controlling each adaptation element of said signal adaptation block upon receipt of said reset signal on the basis of a measurement of the incoming burst signal.

2. A system according to claim 1, characterized in that the reset signal generator is provided for modifying the common-mode level on the differential lines and that the reset signal receptor is a common-mode level measurement block.

3. A system according to claim 1, characterized in that said input, said signal adaptation block, said single-ended-to-differential converter, said reset signal receptor and said settings determination block are integrated in a first chip and that said end-of-burst detector and said reset signal generator are integrated in a second chip, said first and second chips being connected by means of said pair of differential lines.

4. A system according to claim 3, characterized in that said first chip is a four I/O pins package with two pins for a positive and a negative supply voltage and two pins forming a differential output for connection to said pair of differential lines.

5. A system according to claim 3, characterized in that said first chip is a five I/O pins package with two pins for a positive and a negative supply voltage, two pins forming a differential output for connection to said pair of differential lines and one pin for providing a received signal strength indication.

6. A system according to claim 3, characterized in that said first chip is a five I/O pins package with two pins for a positive and a negative supply voltage, two pins forming a differential output for connection to said pair of differential lines and one pin for supplying a bias voltage to a photodiode.

7. A system according to claim 1, characterized in that said input is formed by a photodiode for placement at a termination of an optical line.

8. A system according to claim 1, characterized in that said end-of-burst detector is comprised in a post amplifier on said differential lines.

9. A system according to claim 1, characterized in that said at least one widely varying characteristic comprises an amplitude of the signal, that said signal adaptation block comprises an amplifier with controllable gain and that said settings determination block is provided for controlling said amplifier on the basis of an amplitude measurement of said incoming burst signal.

10. A system according to claim 1, characterized in that said at least one widely varying characteristic comprises a DC-offset of the signal, that said signal adaptation block comprises a DC-offset correction element and that said settings determination block is provided for controlling said DC-offset correction element on the basis of a DC-offset measurement of said incoming burst signal.

11. A method for transferring incoming single-ended burst signals with at least one characteristic which varies widely from burst to burst onto a pair of differential lines, said method comprising the steps of:
    a) receiving an incoming burst signal on an input,
    b) adapting said at least one characteristic of the incoming burst signal by means of a signal adaptation block with at least one controllable adaptation element connected to said input,
    c) converting the burst signal to a differential signal to be placed on said pair of differential lines in forwards direction by means of a single-ended-to-differential converter connected to said signal adaptation block,
    d) detecting burst ends in said differential signal by means of an end-of-burst detector connected to said pair of differential lines,
    e) upon detection of one of said burst ends, generating a reset signal to be placed on said differential lines in backwards direction by means of a reset signal generator connected to said end-of-burst detector,
    f) receiving said reset signal by means of a reset signal receptor connected to said pair of differential lines backwards from said reset signal generator,
    g) upon receipt of said reset signal, controlling each adaptation element of said signal adaptation block on the basis of a measurement of an incoming burst by means of a settings determination block connected to said reset signal receptor and said signal adaptation block.

12. A method according to claim 11, characterized in that the reset signal is generated by modifying the common-mode level on the differential lines, the reset signal receptor being a common-mode level measurement block.

13. A system for transferring incoming single-ended burst signals with at least one characteristic which varies widely from burst to burst onto a pair of differential lines, said system comprising:

an input for receiving an incoming burst signal, each incoming burst comprising a preamble and a subsequent data section;

a signal adaptation block with at least one controllable adaptation element connected to said input and provided for adapting said at least one characteristic of the incoming burst signal;

a single-ended-to-differential converter connected to said signal adaptation block for converting the burst signal to a differential signal to be placed on said pair of differential lines in forwards direction;

a settings determination block connected to said signal adaptation block, for controlling each adaptation element of said signal adaptation block during treatment of said preamble on the basis of a measurement of the incoming burst; and a status freezing mechanism connected to said input and said settings determination block, for freezing each adaptation element of said signal adaptation block during treatment of said data section of each incoming burst.

14. A system according to claim 13, characterized in that the status freezing mechanism comprises:

an activity detection block connected to said input for detecting the start of said preamble, said activity detection block being provided for comparing the incoming burst with an activity threshold;

a timer connected to said activity detection block, said timer having a predetermined time delay in function of the duration of said preamble, the activity detection block being adapted for triggering the timer upon crossing of the activity threshold;

a freezing signal generator connected to said timer and said settings determination block, for generating a freezing signal upon completion of said time delay.

15. A system according to claim 14, characterized in that the status freezing mechanism further comprises:

an overload detection block connected to said input and adapted for retriggering said timer and said freezing signal generator, said overload detection block being provided for comparing the incoming burst with an overload threshold and retriggering said timer and said freezing signal generator upon crossing of the overload threshold.

16. A system according to claim 13, characterized in that said at least one widely varying characteristic comprises an amplitude of the signal, that said signal adaptation block comprises an amplifier with controllable gain and that said settings determination block is provided for controlling said amplifier on the basis of an amplitude measurement of said incoming burst signal.

17. A system according to claim 13, characterized in that said at least one widely varying characteristic comprises a DC-offset of the signal, that said signal adaptation block comprises a DC-offset correction element and that said settings determination block is provided for controlling said DC-offset correction element on the basis of a DC-offset measurement of said incoming burst signal.

18. A method for transferring incoming single-ended burst signals with at least one characteristic which varies widely from burst to burst onto a pair of differential lines, said method comprising the steps of:

receiving an incoming burst signal on an input, each incoming burst comprising a preamble and a subsequent data section;

adapting said at least one characteristic of the incoming burst signal by means of a signal adaptation block with at least one controllable adaptation element connected to said input;

converting the burst signal to a differential signal to be placed on said pair of differential lines in forwards direction by means of a single-ended-to-differential converter connected to said signal adaptation block;

controlling each adaptation element of said signal adaptation block during treatment of said preamble on the basis of a measurement of the incoming burst by means of a settings determination block connected to said signal adaptation block; and freezing each adaptation element of said signal adaptation block during treatment of said data section of each incoming burst by means of a status freezing mechanism connected to said input and said settings determination block.

19. A method according to claim 18, characterized in that the step of freezing each adaptation element comprises the steps of:

comparing the incoming burst with an activity threshold by means of an activity detection block connected to said input, thereby detecting the start of said preamble;

upon crossing of the activity threshold, triggering a timer which is connected to said activity detection block and has a predetermined time delay in function of the duration of said preamble; and upon completion of said time delay, generating a freezing signal by means of a freezing signal generator connected to said timer and said settings determination block.

20. A method according to claim 19, further comprising the steps of:

comparing the incoming burst with an overload threshold by means of an overload detection block which is connected to said input and is adapted for retriggering said timer and said freezing signal generator; and upon crossing of the overload threshold, retriggering said timer and said freezing signal generator.

21. A method according to claim 18, characterized in that said at least one widely varying characteristic comprises an amplitude of the signal, that said signal adaptation block comprises an amplifier with controllable gain and that said settings determination block is provided for controlling said amplifier on the basis of an amplitude measurement of said incoming burst signal.

22. A system according to claim 18, characterized in that said at least one widely varying characteristic comprises a DC-offset of the signal, that said signal adaptation block comprises a DC-offset correction element and that said settings determination block is provided for controlling said DC-offset correction element on the basis of a DC-offset measurement of said incoming burst signal.

* * * * *